United States Patent [19]

Weaver

[11] 4,366,252

[45] Dec. 28, 1982

[54] FLUORINE-FREE, ZIRCONIA-FREE, X-RAY ABSORBING SILICA BASED GLASS, CONTAINING OXIDES OF LEAD, BARIUM AND STRONTIUM PLUS OXIDES OF CALCIUM, MAGNESIUM, SODIUM, POTASSIUM, CERIUM, TITANIUM, ARSENIC AND ANTIMONY

[75] Inventor: Edward A. Weaver, Toledo, Ohio

[73] Assignee: Owens-Illinois, Inc., Toledo, Ohio

[21] Appl. No.: 129,949

[22] Filed: Mar. 13, 1980

[51] Int. Cl.$^3$ .......................... C03C 3/04; C03C 3/10; H01J 1/00

[52] U.S. Cl. .................................... 501/60; 252/478; 313/480; 501/62; 501/64; 501/70; 501/71; 501/72

[58] Field of Search .................... 106/52, 53; 313/480; 501/60, 62, 64, 70, 71, 72; 252/478

[56] References Cited

U.S. PATENT DOCUMENTS

| | | | |
|---|---|---|---|
| 2,901,366 | 8/1959 | Smith et al. | 106/52 |
| 3,258,352 | 6/1966 | Paymal | 501/62 |
| 3,464,932 | 9/1969 | Connelly et al. | 252/478 |
| 3,794,502 | 2/1974 | La Grouw | 313/480 X |
| 3,805,107 | 4/1974 | Boyd | 106/52 |
| 3,907,584 | 9/1975 | Wada et al. | 106/53 |
| 3,987,330 | 10/1976 | Shell | 313/480 |
| 4,015,966 | 4/1977 | Weaver | 106/52 |
| 4,065,317 | 12/1977 | Baak et al. | 106/52 |
| 4,065,697 | 12/1977 | Steierman | 313/480 |
| 4,089,693 | 5/1978 | La Grouw et al. | 106/52 |
| 4,174,490 | 11/1979 | Van Erk et al. | 313/480 |
| 4,179,638 | 12/1979 | Boyd et al. | 313/480 |
| 4,277,286 | 7/1981 | Boyd et al. | 106/52 |

FOREIGN PATENT DOCUMENTS

| | | | |
|---|---|---|---|
| 48-14162 | 5/1973 | Japan . | |
| 50-87405 | 7/1975 | Japan | 313/480 |
| 51-71314 | 6/1976 | Japan | 501/62 |
| 1313243 | 4/1973 | United Kingdom | 501/64 |

*Primary Examiner*—Helen M. McCarthy
*Attorney, Agent, or Firm*—David R. Birchall; Myron E. Click; David H. Wilson

[57] ABSTRACT

A fluorine-free glass composition is disclosed especially adapted for forming the faceplate of a cathode ray tube such as a television tube. The glass is silica based and includes a fluorine-free flux and an X-ray absorber which may comprise lead oxide, barium oxide, strontium oxide, and mixtures thereof. Optionally, the glass may contain still other oxides to impart desired physical properties. The absence of fluorine avoids the usual problems of that ingredient in melting and processing the glass. In addition, the resultant glass as a faceplate provides improved protection to a viewer of a cathode ray tube by excellent absorption of X-rays.

3 Claims, No Drawings

4,366,252

FLUORINE-FREE, ZIRCONIA-FREE, X-RAY ABSORBING SILICA BASED GLASS, CONTAINING OXIDES OF LEAD, BARIUM AND STRONTIUM PLUS OXIDES OF CALCIUM, MAGNESIUM, SODIUM, POTASSIUM, CERIUM, TITANIUM, ARSENIC AND ANTIMONY

BACKGROUND OF THE INVENTION

In one respect, the background of the invention concerns the use of fluorine in glass making. Fluorine in the form of a salt is a common ingredient of many glass batches. During the melting and refining of a glass batch, fluorine aids in the processing of the molten glass. For example, fluorine assists in refining of the glass melt by reducing the viscosity of the melt at relatively high temperatures and also helps release gases from the melt.

However, the use of fluorine in glass batches has several drawbacks. As a gas, fluorine is quite toxic and corrosive, and its use may become more restricted because of environmental pollution considerations. Fluorine attacks molds in which a glass melt may be cast and can severely shorten mold life.

The problems of fluorine cannot be easily overcome. Ordinarily, decreasing or deleting the amount of fluorine appreciably alters the needed or desirable properties of the glass to a point where the value and usefulness of the glass are endangered.

In another respect, the background of the invention concerns the ability of a glass to absorb X-rays. Cathode ray tubes, especially in the form of television tubes having glass faceplates, are in very common use. The faceplate has a cathodoluminescent surface. In performing its function, an electron gun of such a tube discharges X-rays toward and through the faceplate and thereby exposes a viewer of the tube to a shower of the rays. Glass faceplates of cathode ray tubes can be designed to absorb some but not all of the X-rays. The more X-rays a faceplate can absorb, the safer the tube is against X-ray exposure. The ability of a glass to absorb X-rays can be quantitatively stated by its linear absorption coefficient. This is a value expressed in reciprocable centimeters and determined for a particular wavelength of 0.6 angstrom. The linear absorption coefficient is a term established in the art and determined by known means. The higher the linear absorption coefficient is the better the absorption of X-rays by the glass.

Again, it is not a simple matter of adding more of a desired ingredient to increase X-ray absorptivity. Added amounts of any ingredient can upset the desired physical properties of a glass, such as adversely affecting its melting point, viscosity, devitrification point and rate, seal stress (stress at an area where two glasses are sealed together), softening point, annealing point, and the like.

It would, therefore, advance the art to develop a glass that is fluorine-free and has a relatively high linear absorption coefficient which, nevertheless, has acceptable workable qualities and physical properties for glass melting, refining, and processing.

SUMMARY OF THE INVENTION

An object of the present invention is to provide a fluorine-free glass. Another object is to provide a glass that has a relatively high linear absorption coefficient that adapts the glass to be used as a faceplate for a cathode ray tube where it can absorb X-rays. A further object is to provide a fluorine-free glass having a relatively high linear absorption coefficient that still retains desirable physical properties enabling it to be melted, refined and processed without difficulty.

The present glasses are silica based and have a non-fluorine-containing flux. Oxides of lead, barium, strontium, and mixtures thereof are included as absorbers of X-rays.

A glass composition of the invention may comprise in weight percent approximately:

| | |
|---|---|
| Metal oxide | 4% to 21% |
| Fluorine-free flux | 8% to 18% |
| Silica | 50% to 70% |

The metal oxide is selected from the group consisting of lead oxide, barium oxide, strontium oxide, and mixtures thereof, provided there is no more than 18% of any one of the metal oxides present.

The flux may be an alkali metal oxide. Still other ingredients in addition to those listed may be included either as additives to vary the glass properties, or as impurities introduced from the principal components, or from still other sources. The glass is prepared in a standard manner by melting batch ingredients affording upon solidification of a melt the desired compositions. The glass of the invention may have a linear absorption coefficient of at least 28. Linear absorption coefficients as high as 33 are possible.

DESCRIPTION OF THE PREFERRED EMBODIMENTS

Compositions illustrating the present glasses, their preparation and use, are described followed by specific examples of glass compositions and their pertinent physical properties.

Glasses of the invention have a general composition comprising in weight percent approximately:

| | |
|---|---|
| Metal oxide | 4% to 21% |
| Fluorine-free flux | 8% to 18% |
| Silica | 50% to 70% |

The metal oxide is selected from the group consisting of lead oxide, barium oxide, strontium oxide, and mixtures thereof, provided there is no more than 18% of any one of the metal oxides present.

Fluorine-free fluxes used in glass making may be used as the flux, but preferably the flux is an alkali metal oxide such as the oxide of sodium, potassium, lithium, and mixtures thereof. Exceeding more than 21% of the X-ray absorbing metal oxide or more than 18% of any one of the three indicated metal oxides does not provide the results desired in the glass. For example, more than the described amounts of the X-ray absorber leads to devitrification of the glass.

A more desirable range comprises in weight percent approximately:

| | |
|---|---|
| Metal oxide | 10% to 16% |
| Fluorine-free flux | 12% to 16% |
| Silica | 60% to 65% | in which the metal oxide again is lead oxide, barium oxide, strontium oxide, and mixtures thereof. In these glasses, the metal oxide content does not exceed 16%. The flux preferably is an alkali metal oxide.

It will be understood that still other components may be present either as additives to vary the glass properties, or as impurities introduced from the principal components, or from still other sources. The composition of such other components is not at all critical as long as they, in combination with their percentage content, do not materially or significantly adversely affect the desired properties of the resulting glasses.

Other oxides which may be added to vary the glass properties or which may be present from other sources includes the oxides of one or more of the following in the amounts indicated:

| Aluminum oxide | 0% to 4% |
|---|---|
| Iron oxide | 0% to 2% |
| Nickel oxide | 0% to 2% |
| Cobalt oxide | 0% to 2% |
| Titanium oxide | 0% to 2% |
| Cerium oxide | 0% to 2% |
| Calcium oxide | 0% to 4% |
| Magnesium oxide | 0% to 4% |
| Arsenic oxide | 0% to 2% |
| Antimony oxide | 0% to 2% |
| Zirconium oxide | 0% to 10% |

Aluminum oxide provides chemical durability and is thought to compensate at least partially for the absence of fluorine in refining the glass melt. The oxides of iron, nickel, and cobalt impart chromaticity that may be desired in the glass. The oxides of titanium and cerium tend to prevent radiation darkening of a faceplate made from the glass due to impingement by X-rays (sometimes referred to as X-ray or electron browning) or from sunlight. The oxides of calcium and magnesium serve as secondary fluxes, impart chemical durability, and adjust setting times of the glass. The oxides of arsenic and antimony act as refining agents.

The glasses are melted in a glass melting furnace and refined to render a glass that is of near optical quality. The entrapped air, small nonglassy particulate matter commonly referred to as stones, and cord glass are held to a minimum. The molten glass is removed from the furnace in measured quantities known as gobs. The gobs of glass are then fed into molds where it is pressed into the configuration of a television viewing surface commonly referred to as a cathode ray tube faceplate. The faceplate is then coupled to the funnel and neck tube to form what is known as a CRT bulb.

Desirable properties of the present glasses include the following:
1. They are fluorine-free.
2. The are resistant to devitrification.
3. They refine well for fluorine-free glasses.
4. They enable a longer mold life and cause less air pollution.
5. They have lower volatilization loss and resultant effluent.
6. Their other physical properties such as viscosity, annealing point, fiber softening point, strain point, cooling time, seal stress, thermal expansion, density, liquidus, and the like are at least acceptable in the melting, refining, and processing of the glass to a final end product.

A faceplate for a cathode ray tube fabricated from a present glass has a relatively high linear absorption coefficient. For example, in a cathode ray tube having a 45 kilovolt operation, a faceplate of the present invention may have a linear coefficient of at least 28 and as high as 33 and higher.

The following examples only illustrate the invention and should not be construed as imposing limitations on the claims. Percentages are by weight unless otherwise indicated.

EXAMPLES 1 THROUGH 3

The following are examples of present glass compositions in weight percent:

|  | Example 1 | Example 2 | Example 3 |
|---|---|---|---|
| $SiO_2$ | 61.37 | 64.1 | 64.00 |
| $Al_2O_3$ | 1.07 | 1.06 | 1.00 |
| $Na_2O$ | 6.95 | 7.75 | 7.80 |
| $K_2O$ | 7.78 | 8.26 | 8.20 |
| MgO | 0.13 | 0.20 | 0.12 |
| CaO | 3.00 | 3.02 | 3.20 |
| SrO | 8.12 | 8.91 | 9.15 |
| BaO | 4.98 | 2.15 | 2.15 |
| PbO | 4.46 | 2.76 | 2.95 |
| $As_2O_3$ | 0.27 | 0.22 | 0.20 |
| $Sb_2O_3$ | 0.44 | 0.48 | 0.45 |
| $TiO_2$ | 0.48 | 0.54 | 0.50 |
| $CeO_2$ | 0.30 | 0.25 | 0.20 |
| $Fe_2O_3$ | — | 0.06 | 0.05 |
| $F_2$ | 0.00 | <0.01 | 0.00 |
|  | 99.35 | 99.77 | 99.97 |

The following Table A provides physical properties of the glass compositions of Examples 1 through 3.

TABLE A

|  | Example 1 | Example 2 | Example 3 |
|---|---|---|---|
| Density, gm/cc. | 2.7761 | 2.6887 | 2.7003 |
| LAC | 33.4* | 28.2 | 29.04 |
| Cooling time, 3–6 sec. | — | 65.0 | 66.5 |
| Cooling time, 3–7 sec. | — | 84.0 | 84.7 |
| Fiber Softening Point, °C. | 685 | — | 682.5 |
| Annealing Point, °C. | 505 | 507 | 506.0 |
| Viscosity, °F. |  |  |  |
| Log 2 | 2565 | 2590 | 2550 |
| Log 3 | 2125 | 2135 | 2093 |
| Log 4 | 1830 | 1835 | 1798 |
| Log 5 | 1614 | 1625 | 1589 |
| Log 6 | 1456 | 1465 | 1434 |
| Log 7 | 1330 | 1340 | 1320 |
| Alpha | 98.8 | — | — |
| Liquidus, °F. | 1577 | 1572 | — |
| Strain Point, °C. | — | 463 | — |
| Softening Point °C. | 871 | 693 | — |

*By computer

The term "LAC" means linear absorption coefficient and was determined for a cathode ray tube operating at 45 kilovolts emitting a wavelength of 0.6 angstrom. The cooling times "3–6" and "3–7" are the times in seconds for the viscosity of the glass in poises to go from the logarithm of the viscosity at $10^3$ to the logarithm of the viscosity at $10^6$ and from the logarithm of the viscosity at $10^3$ to the logarithm of the viscosity at $10^7$, respectively.

The fiber softening point is the temperature at which a fiber of the glass of standard dimensions has a viscosity of $10^{7.6}$ poises. The viscosity values given in Table A at Log 2 through Log 7 are the temperatures in degrees Farenheit of the glass at which the viscosity of the glass in poises is equal to the logarithm of the viscosity at $10^2$ to $10^7$, respectively. The term "alpha" is a measure of the thermal expansion and is equal to the value expressed times $10^{-7}$ per degree centigrade. The liquidus is the highest temperature at which all crystals of the glass are first dissolved. The strain point is the temperature at which internal strain in the glass is first relieved. It is equivalent to the logarithm of the viscosity at $10^{14.6}$ poises.

Although the foregoing discloses several embodiments of the present invention, it is understood that the invention may be practiced in still other forms within the scope of the following claims.

I claim:

1. A fluorine-free and zirconia-free glass having a linear absorption coefficient of at least 28 and substantially the following composition in weight percent:

| | |
|---|---|
| Lead oxide | 4½% |
| Barium oxide | 5% |
| Strontium oxide | 8% |
| Na$_2$O | 7% |
| K$_2$O | 7¾% |
| Silica | 61¼% |
| Aluminum oxide | 1% |
| Calcium oxide | 3% |
| Magnesium oxide | ¼% |
| Titanium oxide | ½% |
| Antimony oxide | ¼% |
| Arsenic oxide | ¼% |
| Cerium oxide | ¼%. |

2. A fluorine-free and zirconia-free glass having a linear absorption coefficient of at least 28 and substantially the following composition in weight percent:

| | |
|---|---|
| Lead oxide | 2¾% |
| Barium oxide | 2¼% |
| Strontium oxide | 9% |
| Na$_2$O | 7¾% |
| K$_2$O | 8¼% |
| Silica | 64% |
| Aluminum oxide | 1% |
| Calcium oxide | 3% |
| Magnesium oxide | ¼% |
| Titanium oxide | ½% |
| Antimony oxide | ¼% |
| Arsenic oxide | ¼% |
| Cerium oxide | ¼% |

3. A fluorine-free and zirconia-free glass having a linear absorption coefficient of at least 28 and substantially the following composition in weight percent:

| | |
|---|---|
| Lead oxide | 3% |
| Barium oxide | 2¼% |
| Strontium | 9¼% |
| Na$_2$O | 7¾% |
| K$_2$O | 8¼% |
| Silica | 64% |
| Aluminum oxide | 1% |
| Calcium oxide | 3¼% |
| Magnesium oxide | ¼% |
| Titanium oxide | ½% |
| Antimony oxide | ¼% |
| Arsenic oxide | ¼% |
| Cerium oxide | ¼% |

* * * * *